Nov. 16, 1937.    G. C. PAXTON    2,099,222
FRESH FRUIT BRUSHER
Filed March 23, 1936
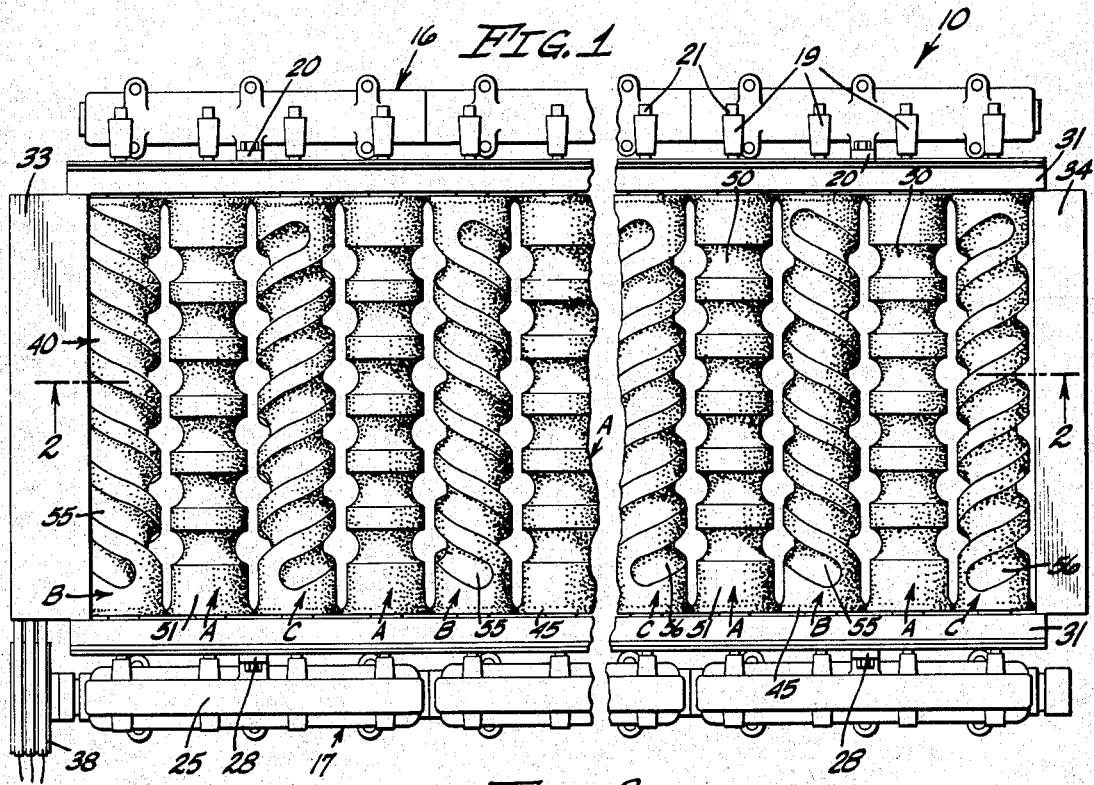
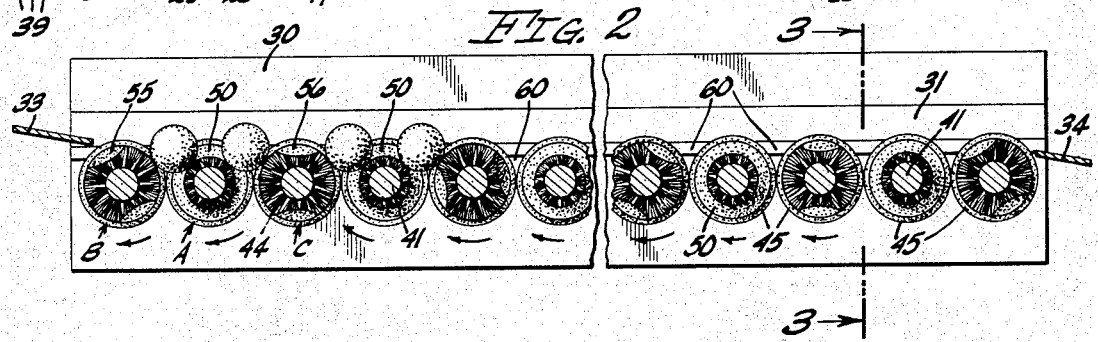
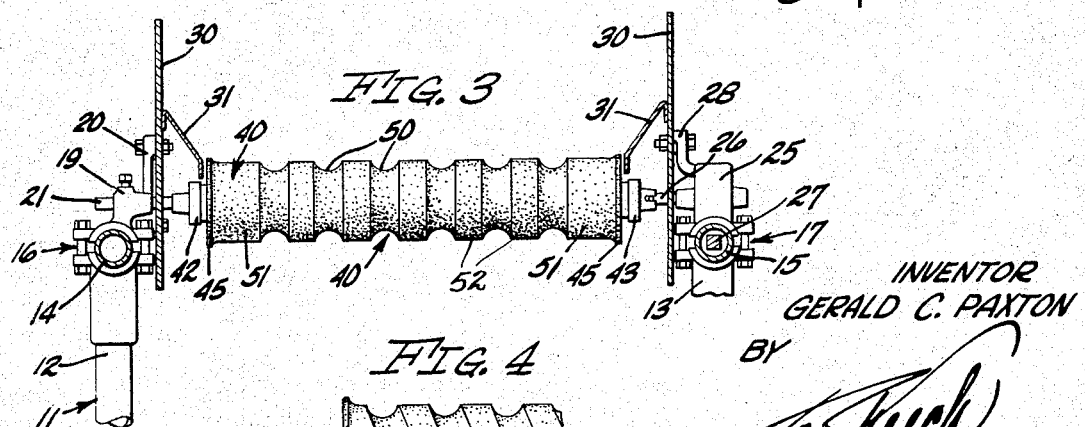
INVENTOR
GERALD C. PAXTON
BY
ATTORNEY Patented Nov. 16, 1937

2,099,222

UNITED STATES PATENT OFFICE 2,099,222

FRESH FRUIT BRUSHER

Gerald C. Paxton, Santa Ana, Calif., assignor, by mesne assignments, to Food Machinery Corporation, a corporation of Delaware Application March 23, 1936, Serial No. 70,494

7 Claims. (Cl. 146—202)

My invention relates to devices for conveying rollable articles and has particularly, utility in devices of this nature in which such articles receive a treatment through contact of the articles with the conveying surfaces of such devices.

During the past decade, transverse roller conveyors have come into wide use in handling citrus fruits, and particularly oranges, incidental to accomplishing a treatment on the fruit such as washing, drying, or polishing the fruit. In most of these conveyors the rollers constitute cylindrical brushes and the various treatments are effected in part at least by the brushing action of these brushes upon the fruit.

My invention has to do with such conveyors and, being particularly useful in a transverse fruit brusher, will be described herein as embodied in such a device.

One of the principal objects of my invention is to increase the efficiency of the treatment of rollable articles such as oranges in a transverse brusher or the like by causing a forcible and intimate contact between the treating surface on the rollers and the articles being treated. As fresh whole fruit is usually very susceptible to injury it is another important object of my invention to provide such a transverse brusher or the like which will handle fruit very gently while the latter is being treated thereby.

In transverse fruit brushers each adjacent pair of brushes forms a valley in which fruit rests and is rotated until dislodged from this valley by the flow of fruit through the machine or by a mechanical cleanout device of some kind. While resting on the rollers forming these valleys, this fruit is constantly being rotated by these rollers. The customary practice has been to prevent fruit moving laterally from out of each of these valleys by the provision of aprons along the sides of the brusher, which aprons form end walls for the fruit treating valleys. I have found, however, that in some cases injury to the fruit being handled is caused by fruit being crowded against one of these aprons while the fruit is being rotated by the rollers.

It is accordingly a further object of my invention to prevent contact of the fruit with the side aprons in a transverse brusher or the like while the fruit is passing through the same.

A still further object of my invention is to provide a transverse fruit brusher or the like in which contact is assured between the brush rollers and all portions of the exterior surface of the fruit being treated thereby.

The manner of accomplishing the foregoing objects, as well as further objects and advantages, will be made manifest in the following description taken in connection with the accompanying drawing, in which:

Fig. 1 is a plan view of a preferred embodiment of my invention.

Fig. 2 is a longitudinal sectional view taken on line 2—2 in Fig. 1.

Fig. 3 is a transverse sectional view taken on line 3—3 in Fig. 2.

Fig. 4 is a diagrammatic view of a modified form of brush roller which might be used in my invention.

Referring specifically to the drawing, the preferred embodiment of the invention shown therein comprises a transverse fruit brusher 10. This brusher has a rigid frame structure 11 including legs 12 and 13, the latter supporting longitudinal tubes 14 and 15 in clamps 16 and 17, the lower halves of which are formed integral with the upper ends of legs 12 and 13. The upper halves of the clamps 16 have idle shaft brackets 19 and wall supporting arms 20. Removably supported in each of the brackets 19 is an idle roller shaft 21. The upper half of the clamps 17 comprises a series of gear housings 25 in which are journaled roller drive shafts 26. Journaled in the pipe 15 is a main drive shaft 27 and suitable gears enclosed by the pipe 15 and the housings 25 connect the main drive shaft 27 with the roller drive shafts 26. The housings 25 have side wall supporting arms 28.

Rigidly supported on the arms 20 and 28 are side walls 30 having aprons 31 mounted on their inner faces, said aprons extending inwardly and downwardly as clearly shown in Fig. 3. Supported between the walls 30 at their opposite ends are drop boards 33 and 34 for feeding the fruit respectively into and from the machine. The shaft 27 is provided with a triple pulley 38 which is connected by belts 39 to drive pulley (not shown) of an electric motor or other suitable source of power. The idle roller shafts 21 and drive shafts 26 are respectively in alignment with each other as shown in Fig. 1 and supported on each aligned pair of these shafts is one of a series of parallel brush rollers 40. While various treatments may be given rollable objects by rollers which do not have a brushing surface the rollers in the brusher 10 are formed with an interior core 41 having metal ferrules 42 and 43 at its opposite ends and having its outer surface formed entirely of bristles 44. The bristles 44 at the endmost extremities of each of the rollers 40 are provided with a flange 45 which is greater in diameter than the balance of the brush 40 and which preferably is sufficiently large that adjacent flanges 45 contact each other as shown in Figs. 1 and 2.

In the manufacture of the brushes 40 the bristles 44 between the flanges 45 are trimmed down to substantially a uniform cylindrical shape and then have grooves of various shapes cut in this surface to destroy its cylindrical character and to provide means for accomplishing certain of the objects of the invention relating to the thorough and efficient treating of the surface of the fruit handled in the machine. It is preferable that the brushes 40 be so grooved as to provide three different types of brushes which will hereafter be identified by the letters A, B and C. Each of the brushes A has a series of annular grooves 50 there being a plane space 51 provided at each end of the brush which is between the endmost groove and the adjacent flange 45 of the brush which space 51 is wider than any of the spaces 52 disposed between adjacent grooves 50.

Brushes B have single or double pitched spiral grooves 55 formed in the surface thereof substantially throughout its length. These grooves, however, terminate inside of the flanges 45 of the brush B.

The brushes C are like the brushes B excepting that they preferably have a single or double pitched spiral groove 56 which is pitched in the opposite direction from that of the groove 55 of the brushes B.

*Operation*

The brusher 10 may be operated with or without a clean-out and as no such device is herein illustrated its operation without such a device will now be explained.

The shaft 27 is rotated by some suitable source of power (not shown) connected with the belt 39 so as to cause a rotation of the rollers 40 at a rate preferably somewhere between 50 R. P. M. and 250 R. P. M. The direction of rotation of the brushes 40 is as indicated by the arrows in Fig. 2. While other arrangements of the brushes may be made it is preferable that they be arranged as indicated in Fig. 1; that is, with every other brush 40 of type A and with a brush C disposed on one side of each of the brushes A and a brush B on the opposite side of that brush A. With the brushes rotating as indicated, fruit such as oranges or the like will be fed into the machine over the drop board 33 so as to fill successively the valleys 60 between adjacent brushes 40 and then flow through the machine and out over the drop board 34.

While resting in each of the valleys 60 the fruit is supported by one of the brushes A and one of the brushes B or C. Owing to the fact that the grooves 50 in the brush A are annular the fruit tends to drop into these grooves and be spun therein by the rotation of the two brushes 40 on which it rests. While thus spinning, however, the fruit is engaged by the thread-like ridges disposed between adjacent turns of the groove 55 or 56, as the case may be, so as to turn the fruit also about a more or less vertical axis. This prevents the fruits spinning about a horizontal axis for any substantial period with the fruit in the same position. The cooperation of the annular grooves 50 and the spiral grooves 55 and 56, therefore, results in a thorough treatment of all portions of the surface of the fruit, with a minimum of tendency to shift the fruit laterally in the valleys 60. Any tendency which there might be of the spiral grooves 55 or 56 to cause a lateral movement of the fruit in the machine is offset by pitching these spiral grooves in opposite directions.

Fig. 4 illustrates a modified form of a brush roller D which might be substituted for both of the brushes B and C. The brush roller D, while otherwise like the other brushes 40, has a series of elliptical grooves 70 each of which is continuous in itself and extends entirely around the brush D. In other words, the only difference between the grooves 70 in the brushes B and the grooves 50 in brush A is that the grooves 70 are formed in planes disposed obliquely to the axis of the brush roller D.

The brushes in a transverse fruit brusher have, previous to my invention, been supplied with grooves for turning the fruit to prevent its being spun about a single axis for too long a period of time, and thus insure all portions of the outer surface of the fruit being contacted by the brushes. These prior art devices, however, either tended to bob the fruit up and down and keep it out of contact with the brushes for a large portion of the time or else they tended to cause the fruit to migrate rapidly in each of the valleys between adjacent brushes either towards one side of the machine or the other. I have observed that when the fruit bobs up and down considerably, as is the case where adjacent brushes are provided with oppositely pitched spiral grooves, a low degree of efficiency in the brushing action results. On the other hand where one of the brushes forming a given valley is spirally grooved and the other is plain as in the Lister Patent No. 1,566,611, the resulting migration of fruit in this valley in the direction in which said spiral groove is pitched sets up a crowding of the fruit against the guard apron on that side of the machine which chafes the rinds of pieces of fruit directly engaging this apron.

It will be observed that in my invention I have preserved the advantages of the spiral grooves and eliminated their disadvantages. This I have done by providing a means which practically checks the drift of fruit which previously resulted from its contact with the spiral threads on the brushes, yet I have utilized these threads to insure rapid changes in the axes about which the fruit is rotated by the brushes upon which it rests.

A further novel result of my invention is the very considerable increase in brushing efficiency which is effected by the same means I have provided for combatting the drifting of the fruit successively towards opposite sides of the machine. This increase in brushing efficiency arises from the fact that the brushes A are provided with surfaces of rotation which embrace large arcuate areas of each piece of fruit disposed opposite one of the grooves 50 thereof. These annular grooves thus not only contribute to the invention an important retarding function but also are responsible for a substantial increase in brushing efficiency.

The retarding effect of brushes A on the tendency of the fruit to be propelled laterally by the threaded brushes is such that with the alternating of the pitch of the threads on brushes B and C the lateral migration of the fruit is practically nullified. As a result there is no tendency of the fruit to pile up as previously at the ends of the valleys towards which the thread of one of the brushes forming said valley is pitched.

As my invention contemplates the achievement of this increased efficiency while at the same time practically eliminating the contact of the fruit with the guard aprons 31, I have combined the retarding effect of the annular grooves 50 of brushes A with the brush end flanges 45 which are embodied in the brush fibers themselves at the opposite ends of all the brushes in the machine so that fruit goes entirely through the machine with only an occasional contact of a piece of fruit with one of the guard aprons 31.

What I claim is:

1. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; and means for rotating said brush rollers in the same direction at a speed substantially between 100 R. P. M. and 275 R. P. M., certain pairs of adjacent brush rollers having one brush roller of each such pair provided with a series of annular grooves of such size as to accommodate said fruit and the other brush roller of each such pair provided with obliquely disposed grooves.

2. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; and means for rotating said brush rollers in the same direction at a speed substantially between 100 R. P. M. and 275 R. P. M., certain pairs of adjacent brush rollers having one brush roller of each such pair provided with a series of annular grooves of such size as to accommodate said fruit and the other brush roller of each such pair provided with helically disposed grooves.

3. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; and means for rotating said brush rollers in the same direction at a speed substantially between 100 R. P. M. and 275 R. P. M., alternate brush rollers in said machine being provided with a series of annular grooves of such size as to accommodate said fruit, and those brush rollers disposed in between the annularly grooved brush rollers having obliquely disposed grooves formed therein.

4. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; and means for rotating said brush rollers in the same direction at a speed substantially between 100 R. P. M. and 275 R. P. M., alternate brush rollers in said machine being provided with a series of annular grooves of such size as to accommodate said fruit, and those brush rollers disposed in between the annularly grooved brush rollers having helically disposed grooves formed therein.

5. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; and means for rotating said brush rollers in the same direction at a speed substantially between 100 R. P. M. and 275 R. P. M., alternate brush rollers in said machine being provided with a series of annular grooves of such size as to accommodate said fruit, and those brush rollers disposed in between the annularly grooved brush rollers having helically disposed grooves formed therein, the grooves of alternate helically grooved brush rollers being oppositely pitched.

6. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; means for rotating said brush rollers in the same direction; aprons for confining the fruit on said brush rollers along opposite sides of said machine, certain of said brush rollers having grooves helically formed therein, said grooves tending to act upon the fruit resting upon and rotated by said brush-rollers to cause said fruit to migrate laterally of said machine against one of said aprons; and flexible flanges formed upon end portions of said brush rollers, said flanges being of greater diameter than the balance of said brush rollers and operating to decrease the lateral pressure of fruit against said side aprons caused by the aforesaid migration.

7. In a machine for treating fresh whole fruits, the combination of: a series of parallel brush rollers placed close together and rotatively mounted on fixed axes disposed transversely of the direction of travel of said fruit over said brush rollers to provide a fruit treating table having fruit treating valleys between adjacent pairs of brush rollers, said fruit resting in said valleys and being rotated and brushed by said brush rollers, and progressing from valley to valley in passing through said machine; means for rotating said brush rollers in the same direction; aprons for confining the fruit on said brush rollers along opposite sides of said machine, certain of said brush rollers having grooves helically formed therein, said grooves tending to act upon the fruit resting upon and rotated by said brush rollers to cause said fruit to migrate laterally of said machine against one of said aprons; and flexible flanges formed upon end portions of said brush rollers from the brush material of said brush rollers, said flanges being of greater diameter than the balance of said brush rollers and operating to decrease the lateral pressure of fruit against said side aprons caused by the aforesaid migration.

GERALD C. PAXTON.